United States Patent
Choi et al.

(10) Patent No.: US 10,834,596 B2
(45) Date of Patent: Nov. 10, 2020

(54) METHOD FOR BLOCKING CONNECTION IN WIRELESS INTRUSION PREVENTION SYSTEM AND DEVICE THEREFOR

(71) Applicant: Samsung Electronics Co., Ltd., Suwon-si (KR)

(72) Inventors: Daesung Choi, Suwon-si (KR); Sungjun Park, Uijeongbu-si (KR); Chulhoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 15/775,185

(22) PCT Filed: Nov. 28, 2016

(86) PCT No.: PCT/KR2016/013766
§ 371 (c)(1),
(2) Date: May 10, 2018

(87) PCT Pub. No.: WO2017/091047
PCT Pub. Date: Jun. 1, 2017

(65) Prior Publication Data
US 2018/0324200 A1 Nov. 8, 2018

(30) Foreign Application Priority Data
Nov. 27, 2015 (KR) .......................... 10-2015-0167947

(51) Int. Cl.
*H04W 12/12* (2009.01)
*H04W 12/08* (2009.01)

(52) U.S. Cl.
CPC ... *H04W 12/1202* (2019.01); *H04W 12/0808* (2019.01); *H04W 12/1204* (2019.01)

(58) Field of Classification Search
CPC . H04W 12/08; H04W 12/12; H04W 12/1202; H04W 12/1204; H04W 12/0808
(Continued)

(56) References Cited

U.S. PATENT DOCUMENTS

2006/0150250 A1* 7/2006 Lee .................. H04W 12/1206
726/23
2007/0275741 A1* 11/2007 Bian ..................... G06F 21/552
455/466
(Continued)

FOREIGN PATENT DOCUMENTS

KR 10-2014-0035600 A 3/2014
KR 10-2014-0070066 A 6/2014
(Continued)

*Primary Examiner* — Mohammad W Reza
(74) *Attorney, Agent, or Firm* — Jefferson IP Law, LLP

(57) ABSTRACT

The present disclosure relates to a method for blocking the connection of an electronic device inside a wireless intrusion prevention system, the method comprising the steps of: successively monitoring wireless frames in a plurality of channels through a first communication module; generating a first blocking message on the basis of at least one wireless frame received as a result of the monitoring and generating a second blocking message on the basis of a first wireless frame, to which a predetermined wireless network technology has been applied, among the at least one wireless frame; and transmitting at least one of the first and second blocking messages through a second communication module. The present disclosure is not limited to the above embodiment, and other embodiments are also possible.

14 Claims, 10 Drawing Sheets

(58) Field of Classification Search
USPC .......................................................... 726/22
See application file for complete search history.

(56) References Cited

U.S. PATENT DOCUMENTS

| | | |
|---|---|---|
| 2008/0102797 A1 | 5/2008 | Coleman et al. |
| 2012/0096539 A1 | 4/2012 | Hu et al. |
| 2014/0082728 A1 | 3/2014 | Kim et al. |

FOREIGN PATENT DOCUMENTS

| | | |
|---|---|---|
| KR | 10-1429178 B1 | 8/2014 |
| KR | 10-1429179 B1 | 8/2014 |
| KR | 10-1557857 B1 | 10/2015 |
| WO | 2013/089395 A1 | 6/2013 |

* cited by examiner

METHOD FOR BLOCKING CONNECTION IN WIRELESS INTRUSION PREVENTION SYSTEM AND DEVICE THEREFOR

TECHNICAL FIELD

The present disclosure relates to a wireless intrusion prevention system and to a method and apparatus for blocking access between an access point (AP) and a terminal.

BACKGROUND ART

With the rapid growth and supply of the Internet, a network environment gradually becomes huge and a form thereof becomes complicated due to the simple and convenient network access of the Internet and various services provided. However, due to various types of network attacks, such as virus, hacking, system intrusion, system administrator right acquisition, intrusion fact concealment, and a service denial attack on the Internet, intrusion into the Internet is increased because the Internet is always exposed to a danger of hacking, damage to public institutes, and social infrastructures and financial institutes is gradually increased and the influence thereof is great. In order to solve such an Internet security problem, there emerges a need for network security technologies, such as virus vaccine, a firewall, integrated security management, and an intrusion detection system.

A wireless LAN system for wireless Internet communication includes a wireless LAN access point (AP) and a wireless LAN terminal. The AP is used by installing equipment, such as an access point device. The wireless LAN terminal functions to receive information provided by the AP and to transfer it to a next stage. An AP that is chiefly used now does not filter out wirelessly intruded hacking information because it provides only the transmission of wireless traffic and a network support function.

An integrated network system using wired and wireless methods has recently been widely developed and used. It is difficult to stably block harmful traffic that approaches in a wired manner, and it is more difficult to stably block harmful traffic that approaches wirelessly. In order to solve this problem, a wireless intrusion prevention system (WIPS) is being developed. The WIPS is a system for detecting or blocking wireless intrusion, such as a rouge AP or a denial of service (DoS) attack, through wireless section monitoring.

DISCLOSURE OF INVENTION

Technical Problem

For example, when an AP and a terminal are connected through a protected deauthentication frame as in the IEEE 802.11w technology, the WIPS may perform blocking in the state in which the AP and the terminal have been connected. Furthermore, if the time taken for the AP and the terminal to be connected is faster than the time taken to generate a blocking event with respect to the AP and the terminal that attempt access, there may be a problem in that blocking cannot be normally performed.

Accordingly, various embodiments of the present disclosure provide a method of rapidly blocking a connection between an AP and a terminal that attempt access over a wireless network to which a given security technology has been applied in advance.

Solution to Problem

An access blocking method of an electronic device within a wireless intrusion prevention system according to an embodiment of the present disclosure may include sequentially monitoring wireless frames in a plurality of channels through a first communication module; generating a first blocking message based on at least one wireless frame received as the results of the monitoring and generating a second blocking message based on a first wireless frame belonging to the at least one wireless frame and to which a given wireless network technology has been applied; and transmitting at least one of the first and the second blocking messages through a second communication module.

An electronic device within a wireless intrusion prevention system according to an embodiment of the present disclosure may include a first communication module; a second communication module; and a controller configured to control to sequentially monitor wireless frames in a plurality of channels through the first communication module and to control to generate a first blocking message based on at least one wireless frame received as the results of the monitoring, generate a second blocking message based on a first wireless frame belonging to the at least one wireless frame and to which a given wireless network technology has been applied, and transmit at least one of the first and the second blocking messages through the second communication module.

Advantageous Effects of Invention

In accordance with the WIPS according to various embodiments of the present disclosure, a connection between an AP and a terminal connected over a known wireless network can be blocked, and a connection between an AP and a terminal can also be blocked before they are connected over a wireless network to which a given security technology has been applied.

MODE FOR THE INVENTION

Figure 1:
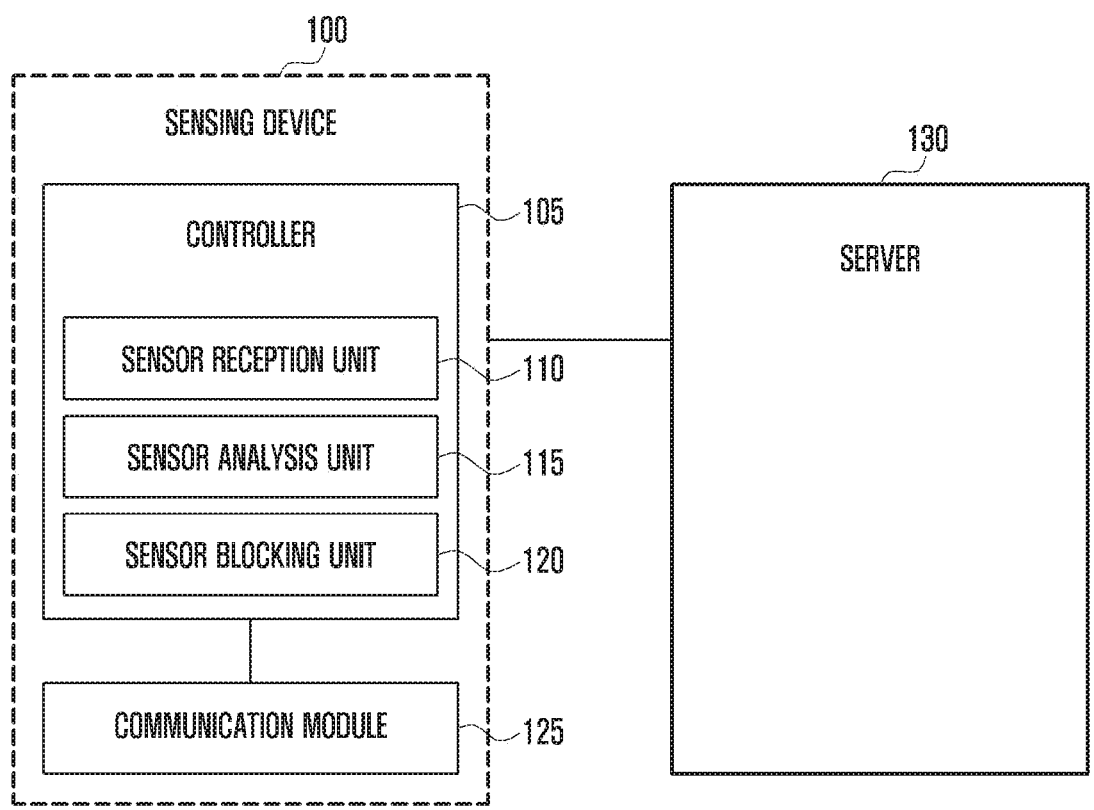
FIG. 1 is a block diagram showing a schematic configuration of a wireless intrusion prevention system (WIPS).

Hereinafter, various embodiments of the present disclosure are described in detail with reference to the accompanying drawings. It is to be noted that the same reference numerals are used throughout the drawings to refer to the same elements. Furthermore, a detailed description of the known functions or elements that may make the gist of the present disclosure vague is omitted.

A wireless intrusion prevention system (WIPS) according to an embodiment of the present disclosure is a system for detecting or blocking wireless intrusion, such as a rouge access point (AP) or a denial of service (DoS) attack, through wireless section monitoring.

A known wireless network described in this specification may refer to wireless networks to which the IEEE 802.11 technology is applied. A wireless network that belongs to the wireless networks and to which a given security technology has been applied may refer to a wireless network to which the IEEE 802.11w technology has been applied. IEEE 802.11w is a modified technology of IEEE 802.11 having enhanced security of a management frame. However, the present disclosure is not limited thereto, and an embodiment of the present disclosure may be applied to wireless networks to which various security technologies have been applied.

FIG. 1 is a block diagram showing a schematic configuration of a wireless intrusion prevention system (WIPS).

Referring to FIG. 1, the WIPS may include a sensing device 100 and a server 130. Meanwhile, in a company network over which a wireless network service and a sensing device may be configured at the same time, the WIPS may further include an AP controller, if necessary.

An operation for the WIPS to determine a blocking policy may be as follows.

For example, the sensing device 100 may monitor a wireless frame, and may process information, such as the MAC address, security configuration contents, frame appearance frequency, transfer rate, amount of data, SSID, and IEEE 802.11 a/b/g/n of a terminal or AP that has transmitted the wireless frame based on the monitored wireless frame, a channel, and an RSSI. Furthermore, the sensing device 100 may transmit the processed information to the server 130.

The server 130 may determine whether the corresponding terminal or AP is not authenticated and whether the corresponding terminal or AP abnormally operates by comparing the processed information with data based (DB) signature information. In this case, the signature may include header information of the wireless frame or information of frame occurrence frequency.

The server 130 may determine whether the detected AP is not authenticated to be two types. The server 130 may determine whether the detected AP is not authenticated based on an SSID, a MAC address or other information stored in the DB. If the corresponding AP is not connected to an in-house wired network, the server 130 may determine the detected AP to be a rouge AP. In this case, whether the corresponding AP is connected to the in-house wired network may be made in various manners. A rouge terminal may be determined in a similar manner.

If it is determined that the corresponding AP has been rouged or the corresponding AP or terminal is an abnormally operating AP or terminal, the server 130 may perform automatic blocking based on a blocking policy or may give alarm so that an administrator performs manual blocking. The server 130 may transmit a blocking target list or blocking policy information to the sensing device 100 based on a blocking determination.

The sensing device 100 may select an AP and a terminal to be blocked based on a determination based on the blocking target list and the blocking policy, and may perform blocking.

For example, the blocking of the sensing device 100 based on the blocking target list and the blocking policy may have the following three types.

1) AP blocking: when the BSSID of a blocking target AP is detected, the sensing device 100 may block all of terminals that access the AP except a specific terminal target.

2) Terminal blocking: when a corresponding terminal is determined to be a rouge terminal or it is detected that the corresponding terminal has been modified into an authenticated terminal, the sensing device 100 may block the corresponding terminal. When the MAC of a corresponding terminal appears, the sensing device 100 may block the entire access of the corresponding terminal to the AP.

3) Specific AP-terminal blocking: when an authenticated terminal is connected to a rouge AP or a rouge terminal is connected to an authenticated AP, the sensing device 100 may block the connection. When the MAC of a corresponding terminal appears, the sensing device 100 may block access to a given AP only, but may not be involved in other access of the AP.

For example, the sensing device 100 may include a controller 105 and a communication module 125.

The communication module 125 may monitor a wireless frame and may transmit a blocking message a terminal and an AP when generating the blocking message.

The controller 105 may generate a blocking message related to a received wireless frame as the results of monitoring based on policy information and a blocking list related to wireless intrusion prevention. Furthermore, the controller 105 may control the generated blocking message to be transmitted to an AP and terminal configured to control to transmit/receive the wireless frame.

For example, the controller 105 may include a sensor reception unit 110, a sensor analysis unit 115 and a sensor blocking unit 120.

The sensor reception unit 110 may monitor a wireless frame in a plurality of channels by controlling the communication module 125.

The sensor analysis unit 115 may analyze the wireless frame received as the results of the monitoring and add/update information of an AP or terminal that has transmitted the wireless frame. The sensor analysis unit 115 may determine whether the AP or the terminal has violated a blocking policy based on a blocking target list and the blocking policy, and may generate a blocking event. The sensor analysis unit 115 may transmit the generated blocking event to the server 130.

The sensor blocking unit 120 may execute the generated blocking event. The sensor blocking unit 120 may generate the blocking message and transmit the blocking message to an AP and a terminal configured to control to transmit/receive the wireless frame.

For example, when an AP and a terminal are connected, the sensor blocking unit 120 may perform blocking by generating a deauthentication frame and transmitting it to the AP and the terminal. The sensor blocking unit 120 may set an address from which a deauthentication frame is transmitted as the BSSID of the AP, may set an address at which the deauthentication frame is received as the MAC address of the terminal, may generate the deauthentication frame, and may transmit the deauthentication frame to the terminal. Furthermore, the sensor blocking unit 120 may set an address from which a deauthentication frame is transmitted as the MAC address of the terminal, may set an address at which the deauthentication frame is received as the BSSID of the AP, may generate the deauthentication frame, and may transmit the deauthentication frame to the AP. Each of the AP and the terminal that has received the deauthentication frame from the sensing device 100 may determine that a counterpart has transmitted the deauthentication frame providing notification of a connection end, and may stop the connection.

Figure 2:
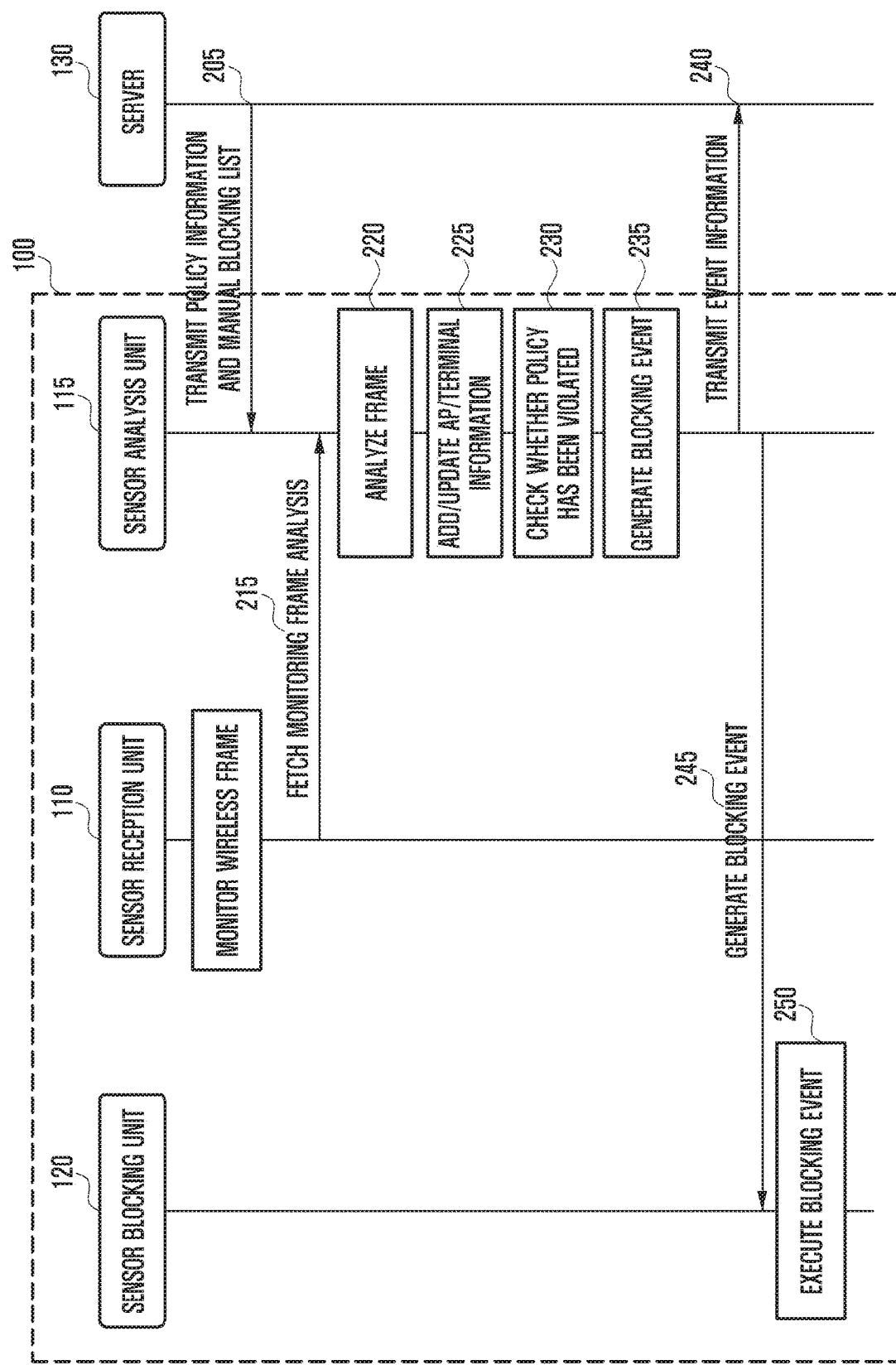
FIG. 2 is a flowchart illustrating a method for the WIPS to block access.

FIG. 2 is a flowchart illustrating a method for the WIPS to block access.

At operation 205, the server 130 may transmit policy information and a blocking list related to wireless intrusion prevention to the sensing device 100.

At operation 210, the sensor reception unit 110 may monitor a wireless frame in a plurality of channels. When a wireless frame is received as the results of the monitoring, the sensor reception unit 110 may fetch the sensor analysis unit 115 to analyze the corresponding wireless frame at operation 215.

At operation 220, the sensor analysis unit 115 may analyze the corresponding wireless frame and may add information of an AP or terminal that has transmitted the corresponding wireless frame or update the information at operation 225. Furthermore, at operation 230, the sensor analysis unit 115 may determine whether the corresponding AP or terminal has violated the policy. If it is determined that the policy has been violated, the sensor analysis unit 115 may generate a blocking event at operation 235. At operation 240, the sensor analysis unit 115 may transmit the generated blocking event information to the server 130.

At operation 245, when the blocking event generated is transmitted to the sensor blocking unit 120, the sensor blocking unit 120 may execute the blocking event at operation 250. For example, as described above, the sensor blocking unit 120 may generate a deauthentication frame and transmit the deauthentication frame to the AP and terminal configured to control to transmit/receive the wireless frame.

Figure 3:
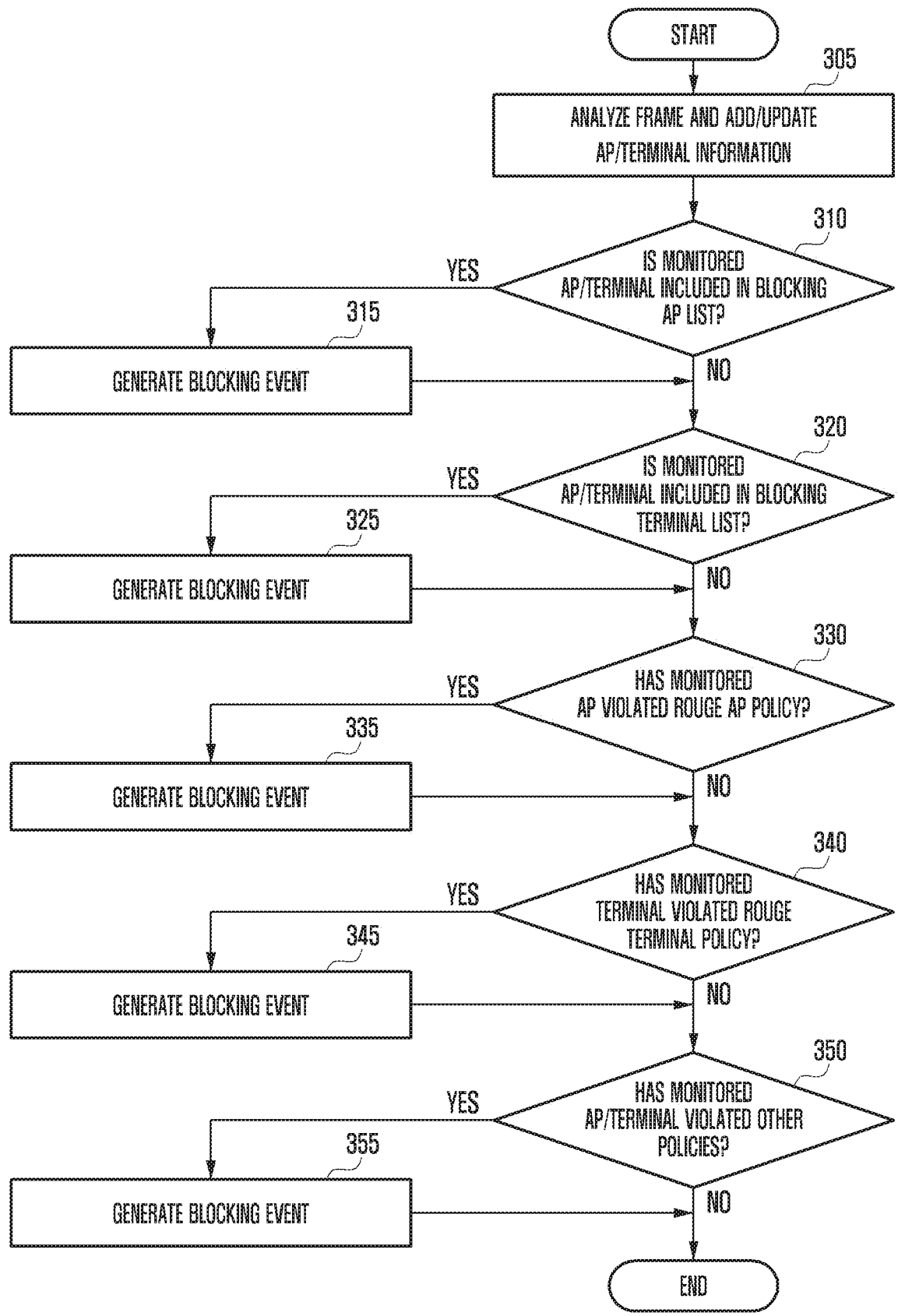
FIG. 3 is a flowchart illustrating a method of determining whether a policy has been violated based on a wireless frame monitored by a sensing device.

FIG. 3 is a flowchart illustrating a method for the sensor analysis unit 115 within a sensing device (e.g., 100) to determine whether a policy has been violated based on a wireless frame monitored by the sensing device.

At operation 305, the sensor analysis unit 115 may analyze a wireless frame, and may add/update information of an AP or terminal that has transmitted the corresponding wireless frame.

The sensor analysis unit 115 may determine whether the monitored AP or terminal is included in a blocking AP list at operation 310, and may generate a blocking event for blocking the connection of the AP and the terminal related to the corresponding wireless frame if the monitored AP or terminal is included in the blocking AP list at operation 315.

The sensor analysis unit 320 may determine whether the monitored AP or terminal is included in a blocking terminal list at operation 320, and may generate a blocking event for blocking the connection of the AP and the terminal related to the corresponding wireless frame if the monitored AP or terminal is included in the blocking AP list at operation 325.

The sensor analysis unit 320 may determine whether the monitored AP has violated a rouge AP policy at operation 330, and may generate a blocking event for blocking the connection of the AP and the terminal related to the corresponding wireless frame if it is determined that the monitored AP has violated the rouge AP policy at operation 335.

The sensor analysis unit 320 may determine whether the monitored terminal has violated a rouge terminal policy at operation 340, and may generate a blocking event for blocking the connection of the AP and the terminal related to the corresponding wireless frame if it is determined that the monitored terminal has violated the rouge terminal policy at operation 345.

The sensor analysis unit 320 may determine whether the monitored AP or terminal has violated other policies at operation 350, and may generate a blocking event for blocking the connection of the AP and the terminal related to the corresponding wireless frame if it is determined that the monitored AP or terminal has violated other policies at operation 355.

Meanwhile, as a technology having enhanced security for a wireless frame such as IEEE 802.11w emerges, the following problems for the AP-terminal access blocking method of the WIPS have emerged.

The existing IEEE 802.11 management frame has not been protected and transmitted. Accordingly, an AP or a terminal receives a deauthentication frame transmitted by a sensor without doubt and stops a counterpart's connection. However, as a technology for protecting a management frame is defined in IEEE 802.11w, an AP or a terminal connected based on IEEE 802.11w neglects a corresponding deauthentication frame if a deauthentication frame is not a protected deauthentication frame. As a result, blocking through a blocking message cannot be performed in the state in which the AP and the terminal have been connected.

Accordingly, when an AP and a terminal attempt access based on IEEE 802.11w, blocking cannot be normally performed because the time taken for the AP and the terminal to be connected is faster than the time taken to generate a blocking message after a policy check.

Accordingly, various embodiments of the present disclosure provide a method for the WIPS to rapidly detect an AP and a terminal that attempt access based on IEEE 802.11w and to perform blocking between the corresponding AP and terminal based on the blocking policy and blocking list of the WIPS. In the following description, a wireless network to which IEEE 802.11w is applied is described as an example, but the present disclosure is not limited thereto. It may be well understood that the present disclosure may be extended and applied to a wireless network having a given security technology applied to a wireless frame.

Figure 4:
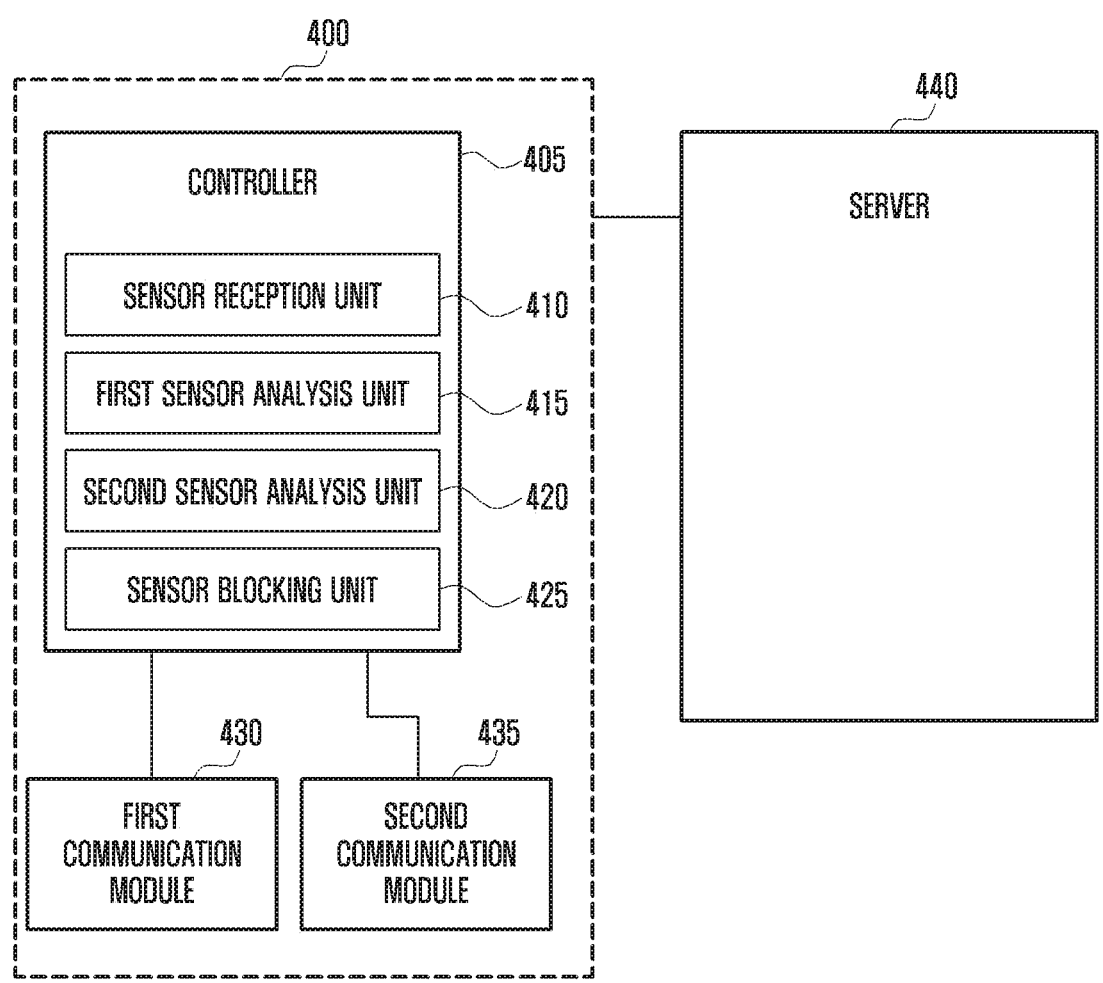
FIG. 4 is a block diagram showing a schematic configuration of a WIPS according to an embodiment of the present disclosure.

FIG. 4 is a block diagram showing a schematic configuration of a WIPS according to an embodiment of the present disclosure.

Referring to FIG. 4, the WIPS according to an embodiment of the present disclosure may include a sensing device 400 and a server 440.

As in the operation described in FIG. 1, the server 440 may determine a blocking target list and blocking policy information and transmit them to the sensing device 400.

The sensing device 400 may include a controller 405 and first and second communication modules 430 and 435.

The first and the second communication modules 430 and 435 according to an embodiment of the present disclosure may separately perform a function of monitoring a wireless frame and a function of transmitting a generated blocking message to an AP and a terminal. For example, the first communication module 430 may sequentially monitor wireless frames in a plurality of channels under the control of the controller 405. Furthermore, the second communication module 435 may transmit a generated blocking message to an AP and a terminal under the control of the controller 405. Since the communication module performing the monitoring function and the communication module transmitting a blocking message are separated, a faster monitoring and blocking operation is possible and thus high blocking performance can be expected.

Figure 5:
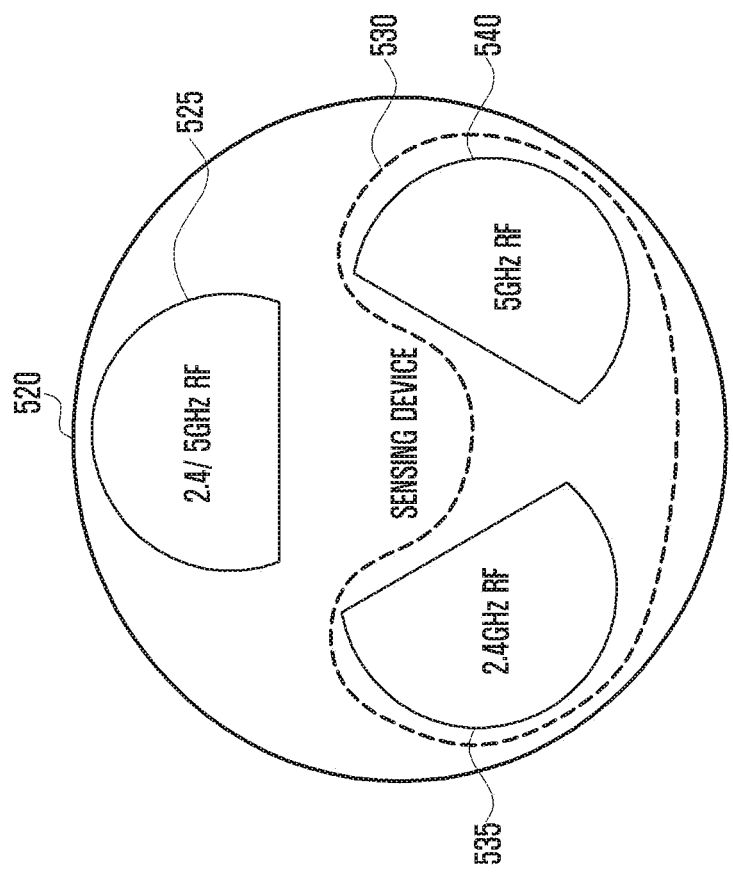
FIG. 5 is a diagram showing an example of the configuration of a communication module within the sensing device.
Figure 5:
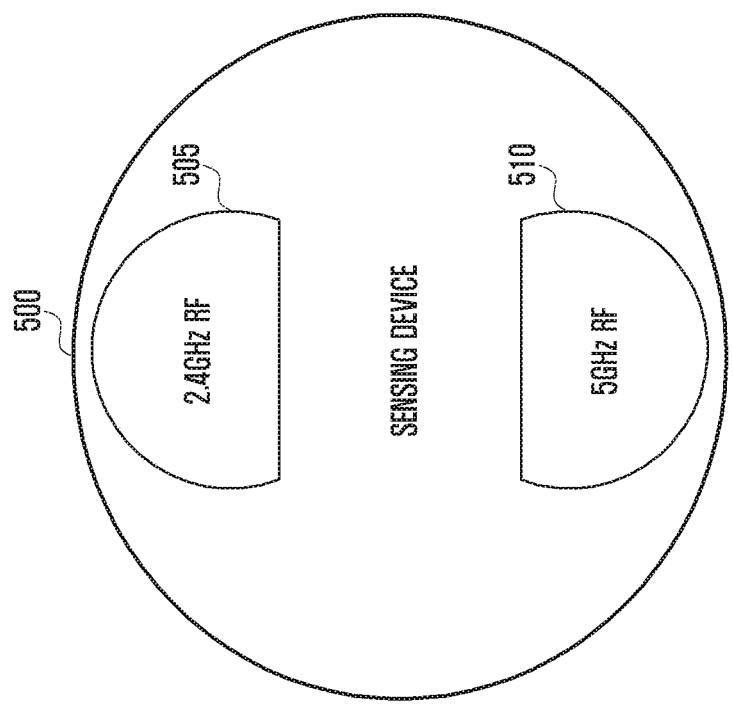

Referring to FIG. 5, the configuration of the communication module included in a sensing device 500 and shown in FIG. 1 may be compared with the configuration of the communication module included in a sensing device 520 and shown in FIG. 4.

For example, the sensing device 500 in which IEEE 802.11w is not taken into consideration may include a communication module 505 performing channel scan and blocking for a 2.4 GHz band and a communication module 510 performing channel scan and blocking for a 5 GHz band, for example.

In contrast, the sensing device 500 in which IEEE 802.11w is taken into consideration may separately include a communication module 525 performing channel scan and a communication module 530 performing blocking. For example, the communication module 525 performing channel scan may perform channel scan on a 2.4 GHz band and a 5 GHz band. Furthermore, the communication module 530 performing blocking may include communication modules 535 and 540 performing blocking for the 2.4 GHz band and the 5 GHz, respectively.

The controller 405 may generate a blocking message related to a wireless frame received as the results of monitoring based on policy information and a blocking list received from the server 440.

In this case, the controller 405 may process an operation of generating a blocking message for a corresponding wireless frame by filtering the wireless frame to which a given wireless network technology (e.g., IEEE 802.11w) has been applied and an operation of sensing a blocking message for a wireless frame to which a known wireless network technology has been applied in parallel. Furthermore, the controller 105 may control the generated blocking message to be transmitted to an AP and a terminal configured to control to transmit/receive the wireless frame.

The following is a description of a concept added in an embodiment of the present disclosure in relation to IEEE 802.11w.

1) Protected Management Frame (PMF)

In the existing wireless LAN, only a data frame can be protected, and a management frame and control frames are not protected. In IEEE 802.11w, a technology capable of protecting some management frames has been regulated as a standard, which is called PMF. Such a frame type includes a de-authentication frame, a disassociation frame and an action management frame.

2) Protected Flag

According to an embodiment of the present disclosure, in order to block access based on IEEE 802.11w, a de-authentication and disassociation message between an AP and a terminal that are connected needs to be checked. However, whether a connection to IEEE 802.11w is possible needs to be estimated because the de-authentication and disassociation message does not have a field capable of identifying IEEE 802.11w. If a wireless tap flag includes a protected flag and the value of the protected flag is 1, it may be estimated that a connected AP and terminal have encrypted (WEP, WPA/WPA2) data.

3) 11w Scan Algorithm

In accordance with an embodiment of the present disclosure, there is proposed an algorithm for increasing the probability that an 11w channel can be scanned by dynamically allocating a channel to a channel in which IEEE 802.11w is detected additionally in the monitoring of a wireless frame.

4) Management Frame Protection Required (MFPR)

An AP or a terminal supporting IEEE 802.11w radiates the MFPR of the RSN capabilities field of a robust security network (RSN) information element (IE) as a beacon or probe message. When a bit of the MFPR is 1, the corresponding AP and terminal may be connected based on IEEE 802.11w only. When a bit of the MFPR is 0, whether a connection with 802.11w may be determined based on MFPC described in 5) below.

5) Management Frame Protection Capable (MFPC)

An AP or terminal supporting 802.11w radiates the MFPC of the RSN capabilities field described in 4) as a beacon or a probe message. When a bit of the MFPC is 1, a connection between the corresponding AP and the corresponding terminal based on IEEE 802.11w is an option. When a bit of the MFPC is 0, the corresponding AP and terminal are not connected based on IEEE 802.11w.

6) Whether IEEE 802.11w According to MFPR and MFPC Configuration is Possible

An AP or terminal may distinguish between MFPC and MFPR when an IEEE 802.11w connection is supported and MFPC and MFPR when an IEEE 802.11w connection is not supported. An AP or a terminal may check whether it is connected to a counterpart based on 802.11w according to each option as follows.

TABLE 1

| AP | Terminal | Whether 802.11w is connected |
|---|---|---|
| MFPC = 0, MFPR = 0 | MFPC = 0, MFPR = 0 | X |
| MFPC = 0, MFPR = 0 | MFPC = 1, MFPR = 0 | X |
| MFPC = 0, MFPR = 0 | MFPC = 1, MFPR = 1 | X |
| MFPC = 1, MFPR = 0 | MFPC = 0, MFPR = 0 | X |
| MFPC = 1, MFPR = 0 | MFPC = 1, MFPR = 0 | O |
| MFPC = 1, MFPR = 0 | MFPC = 1, MFPR = 1 | O |
| MFPC = 1, MFPR = 1 | MFPC = 0, MFPR = 0 | X |
| MFPC = 1, MFPR = 1 | MFPC = 1, MFPR = 0 | O |
| MFPC = 1, MFPR = 1 | MFPC = 1, MFPR = 1 | O |

The operation of the controller 405 is described below on the assumption that the IEEE 802.11w-related technology has been applied.

The controller 405 may include a sensor reception unit 410, a first sensor analysis unit 415, a second sensor analysis unit 420 and a sensor blocking unit 425, for example. The elements of the controller 405 may be divided in terms of software or may be divided in terms of hardware. The controller 405 is not limited to the above elements and may be designed in various manners that implement the same function.

The sensor reception unit 410 may monitor a wireless frame in a plurality of channels by controlling the first communication module 430. As will be described later, the sensor reception unit 410 may dynamically allocate a channel additionally in order to monitor a channel that belongs to a plurality of channels and through which the wireless frame of IEEE 802.11w has been transmitted.

The first sensor analysis unit 415 may filter the wireless frame of IEEE 802.11w from at least one wireless frame received as the results of the monitoring, and may generate a blocking event for the filtered wireless frame based on a blocking target list and a blocking policy. Meanwhile, if a policy application for IEEE 802.11w has not been activated, the first sensor analysis unit 415 may generate policy violation expectation information about the wireless frame. When the corresponding policy application is subsequently activated, the first sensor analysis unit 415 may generate a blocking event for the wireless frame based on the policy violation expectation information.

If the wireless frame is a beacon frame, the first sensor analysis unit 415 may generate a fake beacon forged from channel information and transmit the fake beacon to a terminal, thereby being capable of delaying unspecified specific terminals' access to an AP supporting IEEE 802.11w.

If the wireless frame is a probe frame, the first sensor analysis unit 415 may generate a blocking event for the wireless frame.

The second sensor analysis unit 420 may determine whether the policy of at least one wireless frame received as the results of the monitoring has been violated based on a blocking target list and a blocking policy, and may generate a blocking event for the wireless frame other than the wireless frame of IEEE 802.11w based on a result of the determination.

The first and the second sensor analysis units 415 and 420 operate in parallel, thus being capable of generating a blocking event for the wireless frame of IEEE 802.11w more rapidly.

The sensor blocking unit 425 may execute a blocking event generated by the first and the second sensor analysis units 415 and 420. The sensor blocking unit 425 may generate a blocking message based on the blocking event and transmit the blocking message to an AP and a terminal configured to control to transmit/receive the wireless frame.

Figure 6:
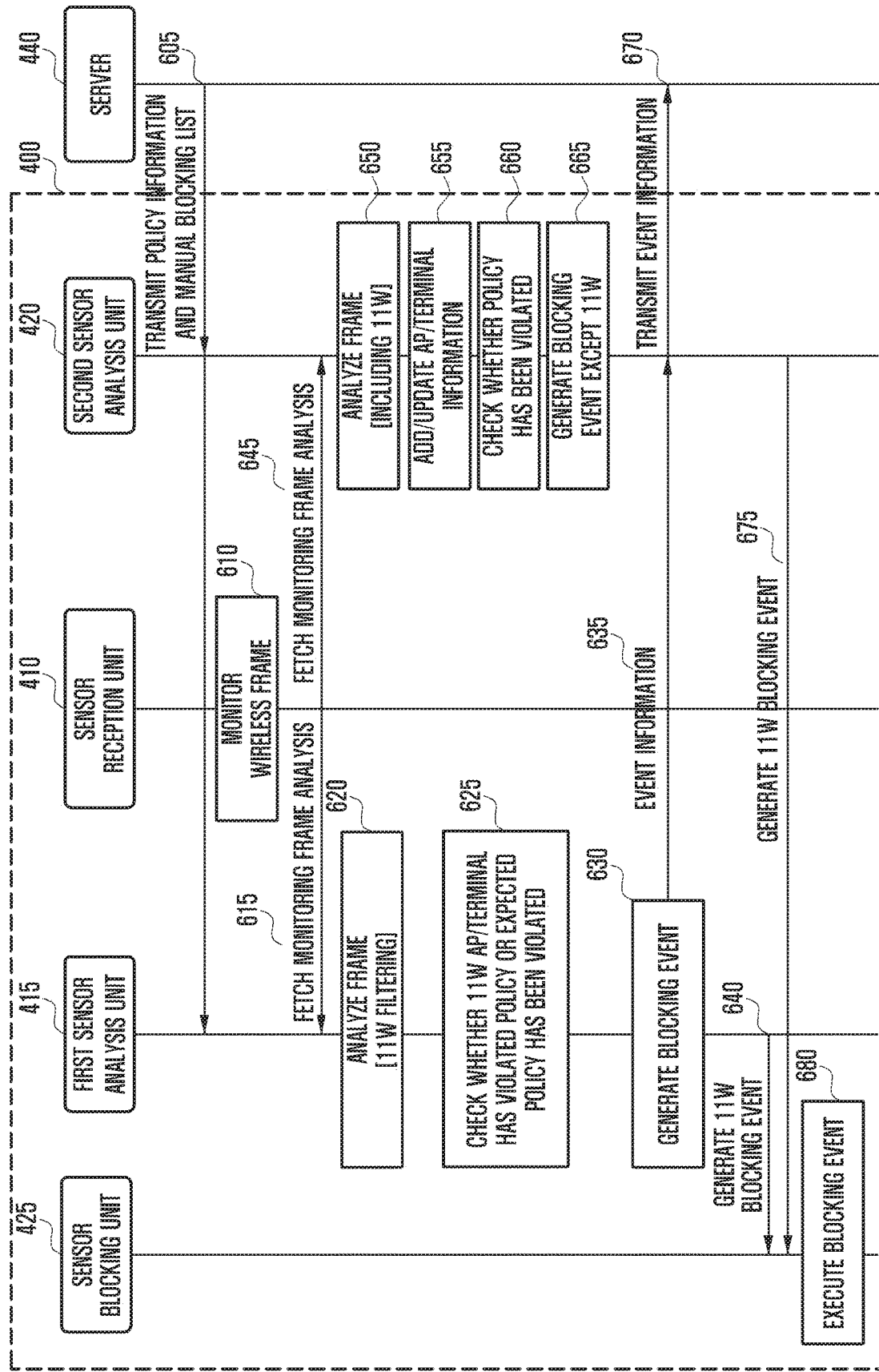
FIG. 6 is a flowchart illustrating a method for the WIPS to block access according to an embodiment of the present disclosure.

FIG. 6 is a flowchart illustrating a method for the WIPS to block access according to an embodiment of the present disclosure.

At operation 605, the server 440 may transmit policy information and a blocking list related to wireless intrusion prevention to the sensing device 400.

Figure 7:
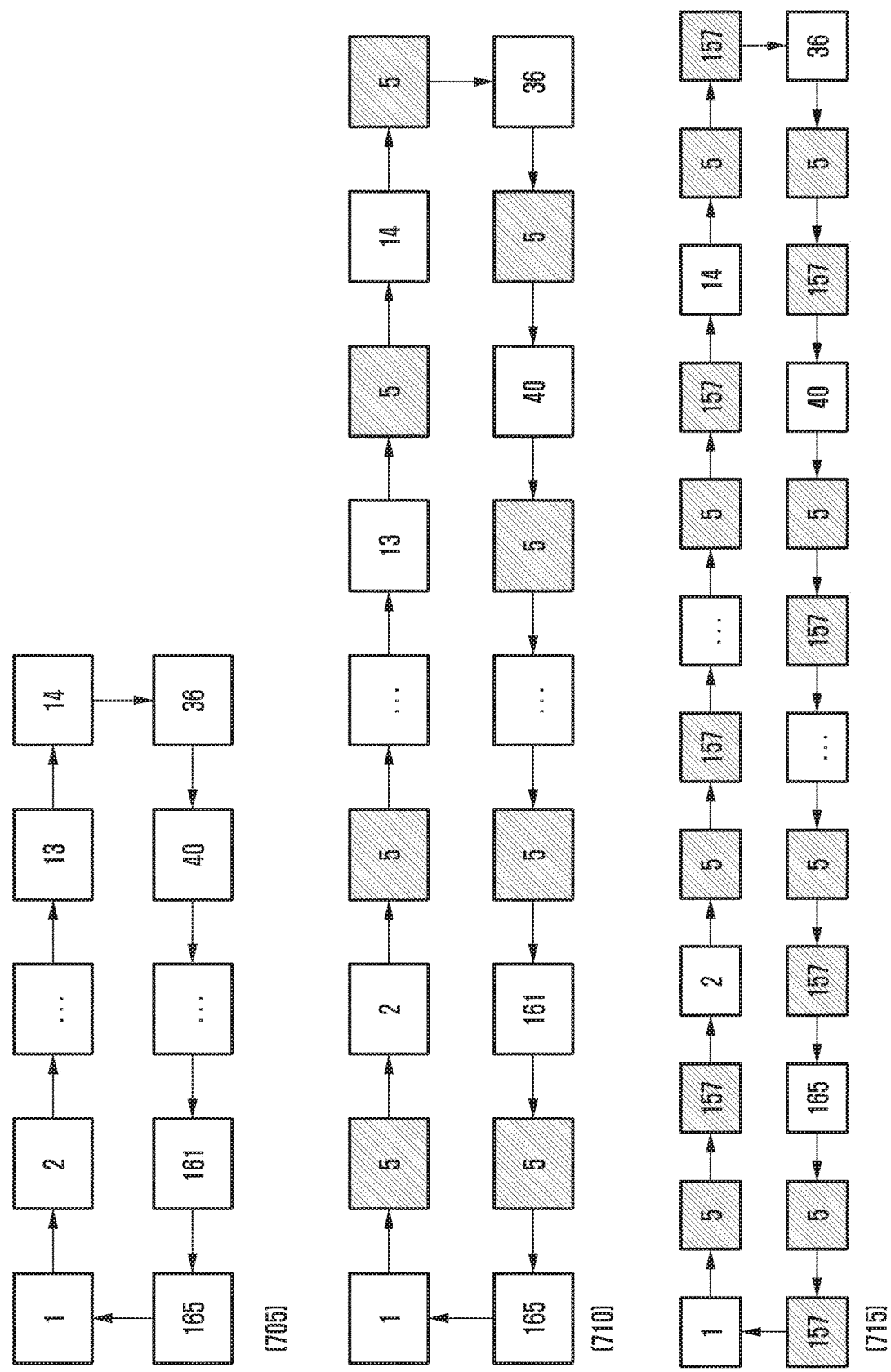
FIG. 7 is a diagram for illustrating the dynamical allocation of a scan channel when the sensing device monitors a channel according to an embodiment of the present disclosure.

At operation 610, the sensor reception unit 410 may sequentially monitor wireless frames in a plurality of channels. For example, as shown in FIG. 7, the sensor reception unit 410 may dynamically allocate a scan channel when monitoring a wireless frame. The sensor reception unit 410 may initially allocate a scan channel as in 705, and may sequentially monitor wireless frames. Thereafter, when an IEEE 802.11w-related channel (e.g., a No. 5 channel) is detected, the sensor reception unit 410 may perform management so that a channel is additionally allocated in order to monitor a corresponding channel as in 710. In addition, when an additional IEEE 802.11w-related channel (e.g., a No. 157 channel) is detected, the sensor reception unit 410 may perform management so that a channel is additionally allocated in order to monitor a corresponding channel as in 715. Accordingly, a blocking event related to the wireless frame of IEEE 802.11w can be performed more rapidly by frequently scanning the IEEE 802.11w-related channel.

When a wireless frame is received as the results of the monitoring, the sensor reception unit 410 may fetch the first sensor analysis unit 415 to analyze the corresponding wireless frame at operation 615.

At operation 620, the first sensor analysis unit 415 may analyze a filtered wireless frame by filtering an IEEE 802.11w wireless frame. Furthermore, at operation 625, if an IEEE 802.11w-related policy application has been activated, the first sensor analysis unit 415 may determine whether a policy for the corresponding wireless frame has been violated. If a policy application related to IEEE 802.11w has not been activated, the first sensor analysis unit 415 may generate policy violation expectation information about the corresponding wireless frame. When the policy application related to IEEE 802.11w is subsequently activated, the first sensor analysis unit 415 may generate a blocking event more rapidly based on the policy violation expectation information.

At operation 630, the first sensor analysis unit 415 may generate a blocking event based on a result of the determination of whether the policy has been violated. For example, if a corresponding wireless frame is a beacon message, the first sensor analysis unit 415 may delay a terminal's access to an AP by generating a fake beacon and transmitting the fake beacon to the terminal. If the wireless frame is a probe message, the first sensor analysis unit 415 may generate a blocking event for the corresponding wireless frame.

At operation 635, the first sensor analysis unit 415 may transmit the generated blocking event information to the server 440. Furthermore, at operation 640, first sensor analysis unit 415 may notify the sensor blocking unit 425 that the blocking event has occurred.

Meanwhile, when the wireless frame is received as the results of the monitoring, the sensor reception unit 410 may fetch the second sensor analysis unit 420 to analyze the corresponding wireless frame at operation 645.

At operation 650, the second sensor analysis unit 420 may analyze the received wireless frame. In this case, the second sensor analysis unit 420 may analyze an IEEE 802.11w wireless frame in addition to the received wireless frame. In this case, when a blocking event is subsequently generated, the second sensor analysis unit 420 may perform tagging on the IEEE 802.11w wireless frame so that the generation of a blocking event for the IEEE 802.11w wireless frame is excluded.

Meanwhile, the second sensor analysis unit 420 may transmit the notification of a corresponding channel to the sensor reception unit 410 when an IEEE 802.11w wireless frame is detected for the aforementioned scan channel dynamic allocation.

At operation 655, the second sensor analysis unit 420 may add or update information about an AP or terminal that has transmitted the corresponding wireless frame. Furthermore, at operation 660, the second sensor analysis unit 420 may determine whether the corresponding AP or terminal has violated a policy. If it is determined that the corresponding AP or terminal has violated the policy, the second sensor analysis unit 420 may generate a blocking event at operation 665. In this case, the second sensor analysis unit 420 may generate the blocking event for a wireless frame other than a tagged IEEE 802.11w wireless frame.

At operation 670, the second sensor analysis unit 420 may transmit the generated blocking event information to the server 440. Furthermore, at operation 675, the second sensor analysis unit 420 may notify the sensor blocking unit 425 that the blocking event has been generated.

At operation 680, the sensor blocking unit 425 may execute the blocking events received from the first and the second sensor analysis units 415 and 420. For example, the sensor blocking unit 425 may generate a blocking message and transmit the blocking message to an AP and terminal configured to control to transmit/receive the wireless frame.

Figure 8:
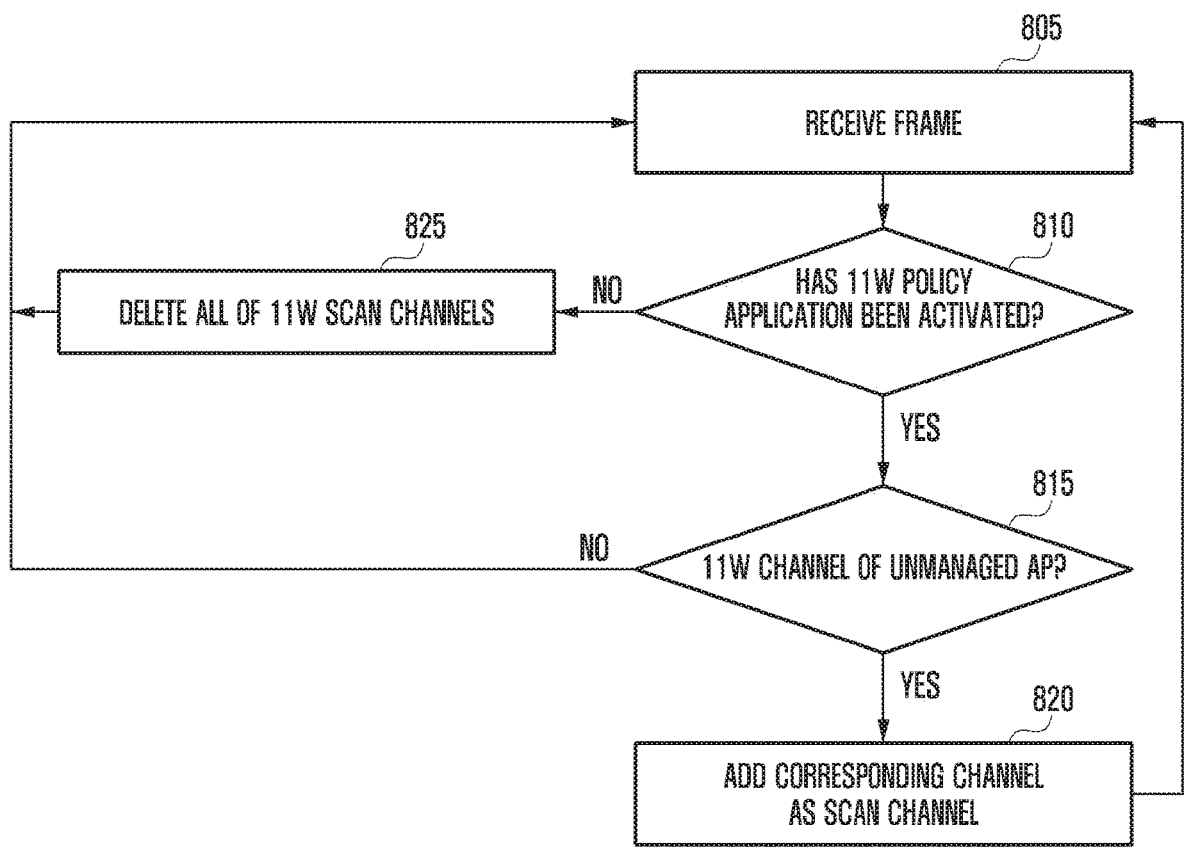
FIG. 8 is a flowchart for illustrating a method of dynamically allocating a scan channel according to an embodiment of the present disclosure.

FIG. 8 is a flowchart for illustrating a method of dynamically allocating a scan channel when the sensor reception unit 410 monitors a wireless frame according to an embodiment of the present disclosure.

At operation 805, the sensor reception unit 410 may receive a wireless frame. Furthermore, at operation 810, the sensor reception unit 410 may determine whether an IEEE 802.11w-related policy application has been activated.

If the policy application has been activated, the sensor reception unit 410 may check whether a channel through which the wireless frame has been received is the IEEE 802.11w channel of an AP which is not now managed as an additional scan channel at operation 815. If the channel is a channel managed as an additional scan channel, the sensor reception unit 410 neglects the channel. However, if the channel is a channel not managed as an additional scan channel, the sensor reception unit 410 may additionally allocate the corresponding channel as a scan channel at operation 820.

In contrast, if the policy application has not been activated, the sensor reception unit 410 may delete all of IEEE 802.11w scan channels now managed as additional scan channels at operation 825.

Figure 9:
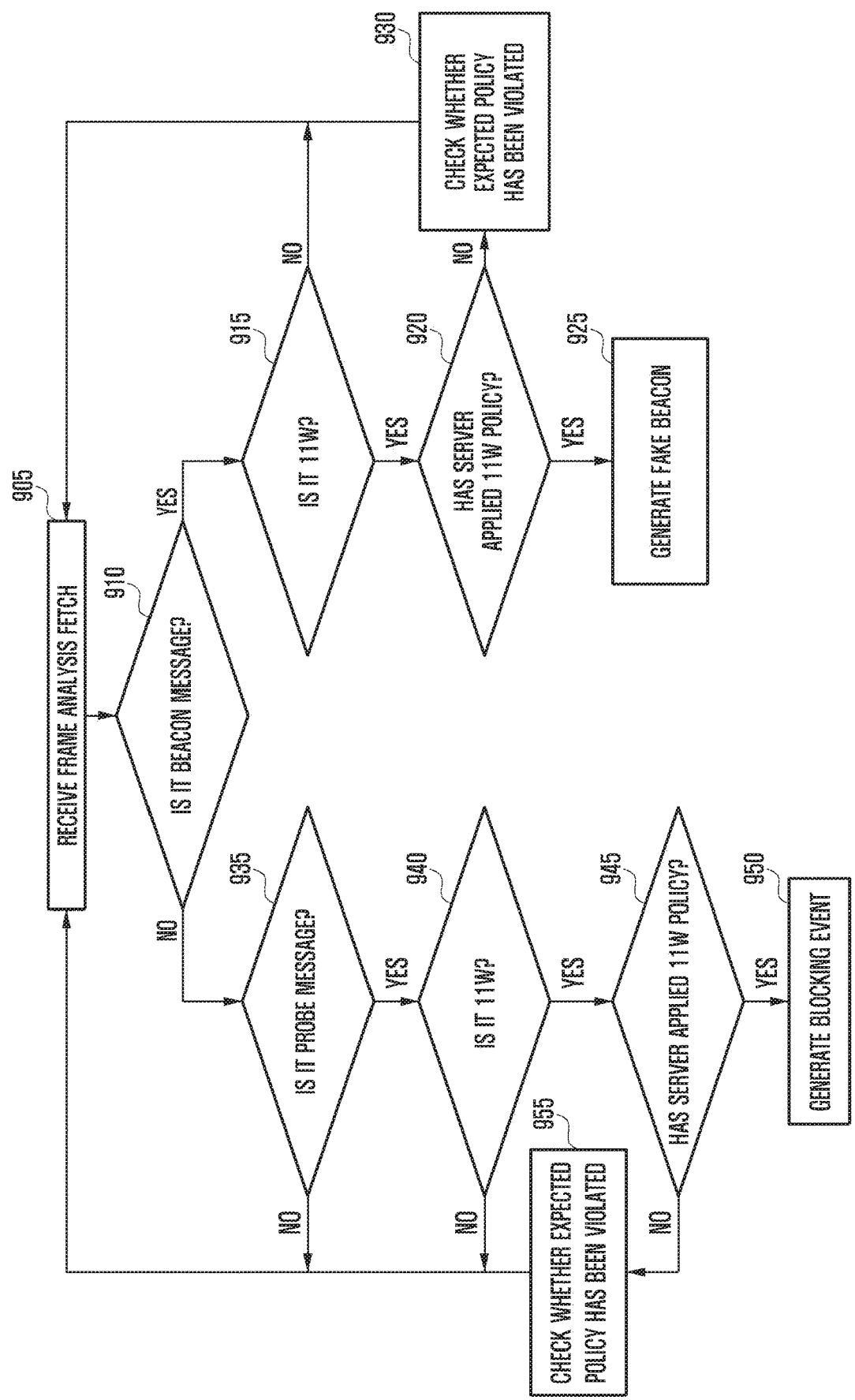
FIG. 9 is a flowchart for illustrating a method for the sensing device to generate a blocking event in relation to a given wireless network according to an embodiment of the present disclosure.

FIG. 9 is a flowchart for illustrating a method for the first sensor analysis unit 415 to generate a blocking event related to a wireless frame supporting IEEE 802.11w according to an embodiment of the present disclosure.

At operation 905, the first sensor analysis unit 415 may receive frame analysis fetching.

At operation 910, the first sensor analysis unit 415 may check whether a corresponding wireless frame is a beacon message.

If the corresponding wireless frame is the beacon message, the first sensor analysis unit 415 may check whether the corresponding wireless frame supports IEEE 802.11w at operation 915. If the corresponding wireless frame is a wireless frame not supporting IEEE 802.11w, the first sensor analysis unit 415 may discard the corresponding wireless frame and analyze a subsequently detected wireless frame.

If the corresponding wireless frame is a beacon message supporting IEEE 802.11w, the first sensor analysis unit 415 may check whether a policy application related to IEEE 802.11w has been activated at operation 920.

If the policy application has been activated, the first sensor analysis unit 415 may generate a fake beacon faked from channel information when the corresponding wireless frame violates the policy at operation 925. The first sensor analysis unit 415 may discard a wireless frame that has not violated the policy. In contrast, if the policy application has not been activated, the first sensor analysis unit 415 may generate policy violation expectation information by checking whether an expected policy for the wireless frame has been violated at operation 930. Accordingly, when the policy application is subsequently activated, the first sensor analysis unit 415 may generate a fake beacon based on the policy violation expectation information as soon as possible.

In contrast, if the corresponding wireless frame is not a beacon message, the first sensor analysis unit 415 may check whether the corresponding wireless frame is a probe message at operation 935. If the corresponding wireless frame is not a probe message, the first sensor analysis unit 415 may discard the corresponding wireless frame and analyze a subsequently detected wireless frame.

If the corresponding wireless frame is a probe message, the first sensor analysis unit 415 may check whether the corresponding wireless frame supports IEEE 802.11w at operation 940. If the corresponding wireless frame is a wireless frame not supporting IEEE 802.11w, the first sensor analysis unit 415 may discard the corresponding wireless frame and analyze a subsequently detected wireless frame.

If the corresponding wireless frame is a probe message supporting IEEE 802.11w, the first sensor analysis unit 415 may check whether a policy application related to IEEE 802.11w has been activated at operation 945.

If the policy application has been activated, the first sensor analysis unit 415 may generate a blocking event for the corresponding wireless frame when the corresponding wireless frame violates the policy at operation 950. The first sensor analysis unit 415 may discard a wireless frame that does not violate the policy. In contrast, if the policy application has not been activated, the first sensor analysis unit 415 may generate policy violation expectation information by checking whether a policy expected for the wireless frame has been violated at operation 955. Accordingly, when the policy application is subsequently activated, the first sensor analysis unit 415 may generate a blocking event based on the policy violation expectation information as soon as possible.

That is, in accordance with an embodiment of the present disclosure, the first sensor analysis unit 415 may store policy violation information of an AP and a terminal related to IEEE 802.11w regardless of whether a policy application from the server has been activated. The policy violation information may continue to be stored while updating a valid period. The stored information may be used in preparation for a case where an AP and a terminal attempting a connection to IEEE 802.11w are not detected in a probe message. That is, if a probe message is not subsequently detected and a blocking message has not been transmitted to a corresponding AP and terminal, a blocking message may be generated based on the stored policy violation information.

Figure 10:
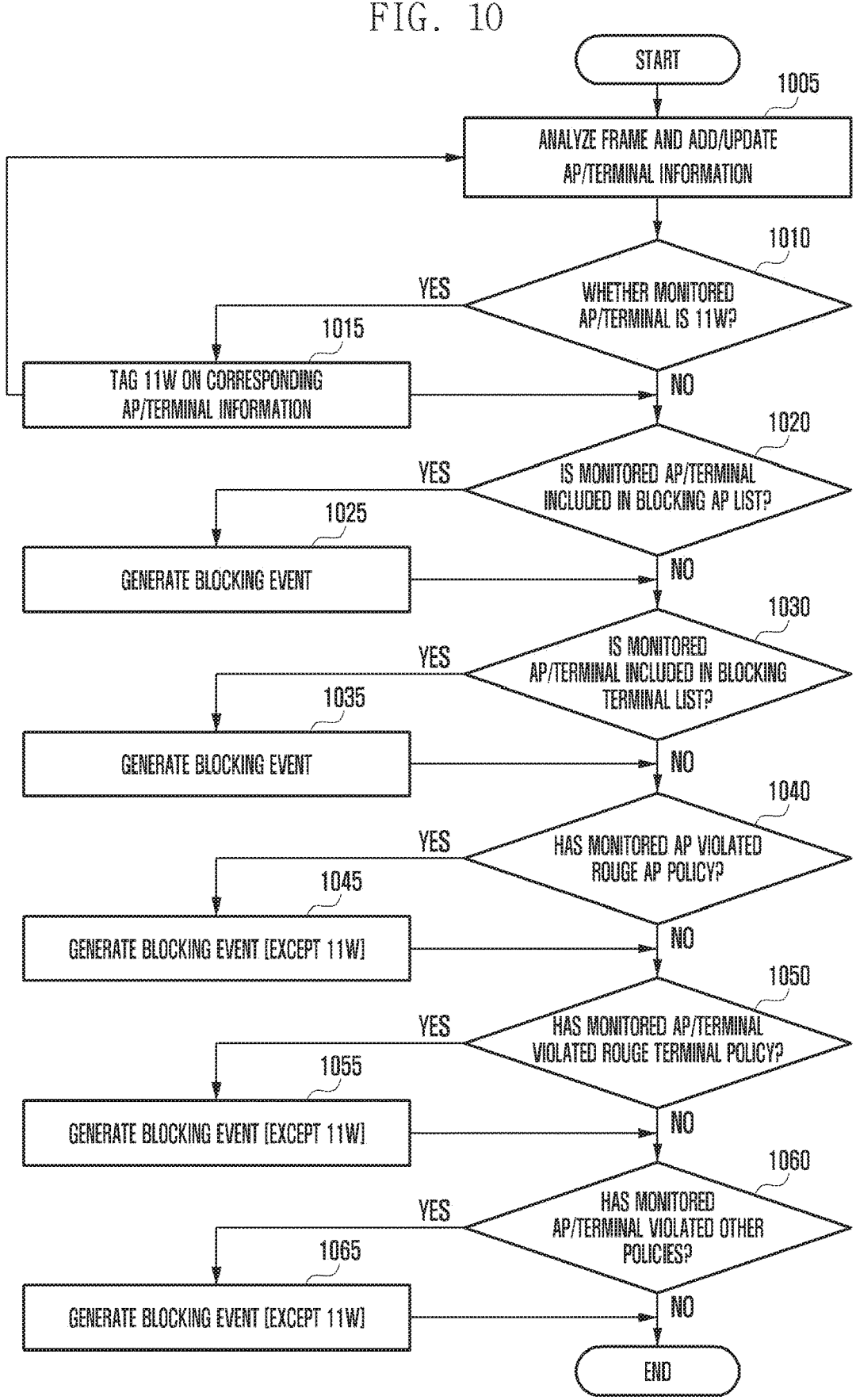
FIG. 10 is a flowchart for illustrating a method for the sensing device to generate a blocking event in relation to a known wireless network according to an embodiment of the present disclosure.

FIG. 10 is a flowchart for illustrating a method for the second sensor analysis unit 420 to generate a blocking event related to a wireless frame according to an embodiment of the present disclosure.

At operation 1005, the second sensor analysis unit 420 may analyze a wireless frame and add/update information of an AP or terminal that has transmitted the corresponding wireless frame.

At operation 1010, the second sensor analysis unit 420 may determine whether the monitored AP or terminal supports IEEE 802.11w. If the monitored AP or terminal supports IEEE 802.11w, the second sensor analysis unit 420 may perform tagging on the AP and terminal information related to the corresponding wireless frame at operation 1015.

At operation 1020, the second sensor analysis unit 420 may determine whether the monitored AP or terminal is included in a blocking AP list. If the monitored AP or terminal is included in the blocking AP list, the second sensor analysis unit 420 may generate a blocking event for blocking the connection of the AP and terminal related to the corresponding wireless frame at operation 1025.

At operation 1030, the second sensor analysis unit 420 may determine whether the monitored AP or terminal is included in a blocking terminal list. If the monitored AP or terminal is included in the blocking AP list, the second sensor analysis unit 420 may generate a blocking event for blocking the connection of the AP and terminal related to the corresponding wireless frame at operation 1035.

At operation 1040, the second sensor analysis unit 420 may determine whether the monitored AP has violated a rouge AP policy. If it is determined that the monitored AP has violated the rouge AP policy, the second sensor analysis unit 420 may generate a blocking event for blocking the connection of the AP and terminal related to the corresponding wireless frame at operation 1045. In this case, the second sensor analysis unit 420 may generate a blocking event other than a blocking event for an AP and a terminal tagged to support IEEE 802.11w.

At operation 1050, the second sensor analysis unit 420 may determine whether the monitored terminal has violated a rouge terminal policy. If it is determined that the monitored terminal has violated the rouge terminal, the second sensor analysis unit 420 may generate a blocking event for blocking the connection of the AP and terminal related to the corresponding wireless frame at operation 1055. In this case, the second sensor analysis unit 420 may generate a blocking event other than a blocking event for an AP and a terminal tagged to support IEEE 802.11w.

At operation 1060, the second sensor analysis unit 420 may determine whether the monitored AP or terminal has violated other policies. If it is determined that the monitored AP or terminal has violated the other policies, the second sensor analysis unit 420 may generate a blocking event for blocking the connection of the AP and the terminal related to the corresponding wireless frame at operation 1065. In this case, the second sensor analysis unit 420 may generate a blocking event other than a blocking event for an AP and a terminal tagged to support IEEE 802.11w.

Meanwhile, the sequence of a determination for generating the blocking event is randomly determined, and may be partially changed and performed.

That is, in accordance with an embodiment of the present disclosure 에, the second sensor analysis unit 420 tags AP or terminal information supporting IEEE 802.11w, thereby preventing the second sensor analysis unit 420 from generating a blocking event for a wireless frame supporting IEEE 802.11w redundantly with the first sensor analysis unit 415.

Furthermore, the embodiments disclosed in this specification and drawings propose only specific examples in order to easily describe the contents of the present disclosure and help understanding, and the embodiments are not intended to restrict the range of right of the present disclosure. Accordingly, it should be understood that all modifications or variations derived based on the technological spirit of the present disclosure in addition to the disclosed embodiments should be construed as being included in the present disclosure.

What is claimed is:

1. An access blocking method of an electronic device within a wireless intrusion prevention system, comprising:
   monitoring wireless frames in a plurality of channels through using a first communication module;
   generating a first blocking message based on at least one wireless frame and generating a second blocking message based on a first wireless frame to which a predetermined security technology has been applied, in parallel; and
   transmitting at least one of the first and the second blocking messages using a second communication module,
   wherein the at least one wireless frame belongs to wireless frames determined to have violated a policy and excluding the first wireless frame from the monitored wireless frames.

2. The access blocking method of claim 1, wherein the monitoring of the wireless frames comprises dynamically allocating a channel belonging to the plurality of channels and through which the first wireless frame has been transmitted additionally for the monitoring.

3. The access blocking method of claim 1, wherein the generating of the first blocking message comprises:
   determining that the policy for the at least one wireless frame has been violated based on policy information and a blocking list; and
   generating the first blocking message for the at least one wireless frame.

4. The access blocking method of claim 1, wherein the generating of the second blocking message comprises:
   generating a fake beacon message having a characteristic different from a characteristic of a beacon message in case that the first wireless frame is the beacon message and a policy application related to the predetermined security technology has been activated; and
   generating policy violation expectation information for the first wireless frame in case that the first wireless frame is the beacon message and the policy application related to the predetermined security technology has not been activated and generating the fake beacon message based on the expectation information when the policy application related to the predetermined security technology is subsequently activated.

5. The access blocking method of claim 1, wherein the generating of the second blocking message comprises:
   generating the second blocking message in case that the first wireless frame is a probe message and a policy application related to the predetermined security technology has been activated; and
   generating policy violation expectation information for the first wireless frame in case that the first wireless frame is the probe message and the policy application related to the predetermined security technology has not been activated and generating the second blocking message based on the expectation information when the policy application related to the predetermined security technology is subsequently activated.

6. The access blocking method of claim 1, further comprising receiving, from a server, policy information and a blocking list used for determining that the policy has been violated.

7. The access blocking method of claim 1, wherein a wireless network applying the predetermined security technology comprises IEEE 802.11w.

8. An electronic device within a wireless intrusion prevention system, comprising:
   a first communication module;
   a second communication module; and
   a controller configured to control to:
      monitor wireless frames in a plurality of channels using the first communication module,
      generate a first blocking message based on at least one wireless frame and generate a second blocking message based on a first wireless frame to which a predetermined security technology has been applied, in parallel, and
      transmit at least one of the first and the second blocking messages using the second communication module,
      wherein the at least one wireless frame belongs to wireless frames determined to have violated a policy and excluding the first wireless frame from the monitored wireless frames.

9. The electronic device of claim 8, wherein the controller is configured to dynamically allocate a channel belonging to the plurality of channels and through which the first wireless frame has been transmitted additionally for the monitoring.

10. The electronic device of claim 8, wherein the controller is configured to:
- determine that the policy for the at least one wireless frame has been violated based on policy information and a blocking list, and
- generate the first blocking message for the at least one wireless frame.

11. The electronic device of claim 8, wherein the controller is configured to:
- generate a fake beacon message having a characteristic different from a characteristic of a beacon message in case that the first wireless frame is the beacon message and a policy application related to the predetermined security technology has been activated, and
- generate policy violation expectation information for the first wireless frame in case that the first wireless frame is the beacon message and the policy application related to the predetermined security technology has not been activated and generate the fake beacon message based on the expectation information when the policy application related to the predetermined security technology is subsequently activated.

12. The electronic device of claim 8, wherein the controller is configured to:
- generate the second blocking message in case that the first wireless frame is a probe message and a policy application related to the predetermined security technology has been activated; and
- generate policy violation expectation information for the first wireless frame in case that the first wireless frame is the probe message and the policy application related to the predetermined security technology has not been activated and generate the second blocking message based on the expectation information when the policy application related to the predetermined security technology is subsequently activated.

13. The electronic device of claim 8, wherein the controller is configured to control to receive, from a server, policy information and a blocking list used for determining that the policy has been violated.

14. The electronic device of claim 8, wherein a wireless network applying the predetermined security technology comprises IEEE 802.11w.

* * * * *